United States Patent [19]

Miller

[11] Patent Number: 4,576,213

[45] Date of Patent: Mar. 18, 1986

[54] METHOD AND APPARATUS FOR MACHINING A DOOR OR THE LIKE

[76] Inventor: Frank A. Miller, 4347 E. Maldonado, Phoenix, Ariz. 85040

[21] Appl. No.: 617,302

[22] Filed: Jun. 4, 1984

[51] Int. Cl.⁴ ............................................. B27M 1/00
[52] U.S. Cl. .................................. 144/371; 144/2 R; 144/82; 144/134 R; 269/25; 269/56; 269/74; 269/201; 269/315; 409/220; 409/225; 409/241; 409/198
[58] Field of Search ............... 409/197, 198, 205, 218, 409/220, 225, 241; 144/27, 2 R, 3 R, 134 R, 82, 84, 371, 136 R; 269/25, 56, 74, 201, 265, 315, 319

[56] References Cited

U.S. PATENT DOCUMENTS

| | | | |
|---|---|---|---|
| 1,163,098 | 12/1915 | McDowell | 144/82 |
| 3,238,980 | 3/1966 | Goldstein | 144/136 X |
| 3,280,863 | 10/1966 | Sturgis | 144/27 |
| 3,339,601 | 9/1967 | Christman et al. | 144/27 |

Primary Examiner—W. D. Bray
Attorney, Agent, or Firm—Don J. Flickinger

[57] ABSTRACT

A table, movably carried upon a stationary base, is provided with a fixed jaw and a movable jaw for gripping the lateral edges of a door or similar panel-like workpiece. The table is movable in reciprocal directions against adjustably positionable stops to place a longitudinal edge of the door at predetermined locations relative the cutting path of a router. The router is mounted upon a carriage which is horizontally and vertically movably supported upon a frame upstanding from the base.

41 Claims, 8 Drawing Figures

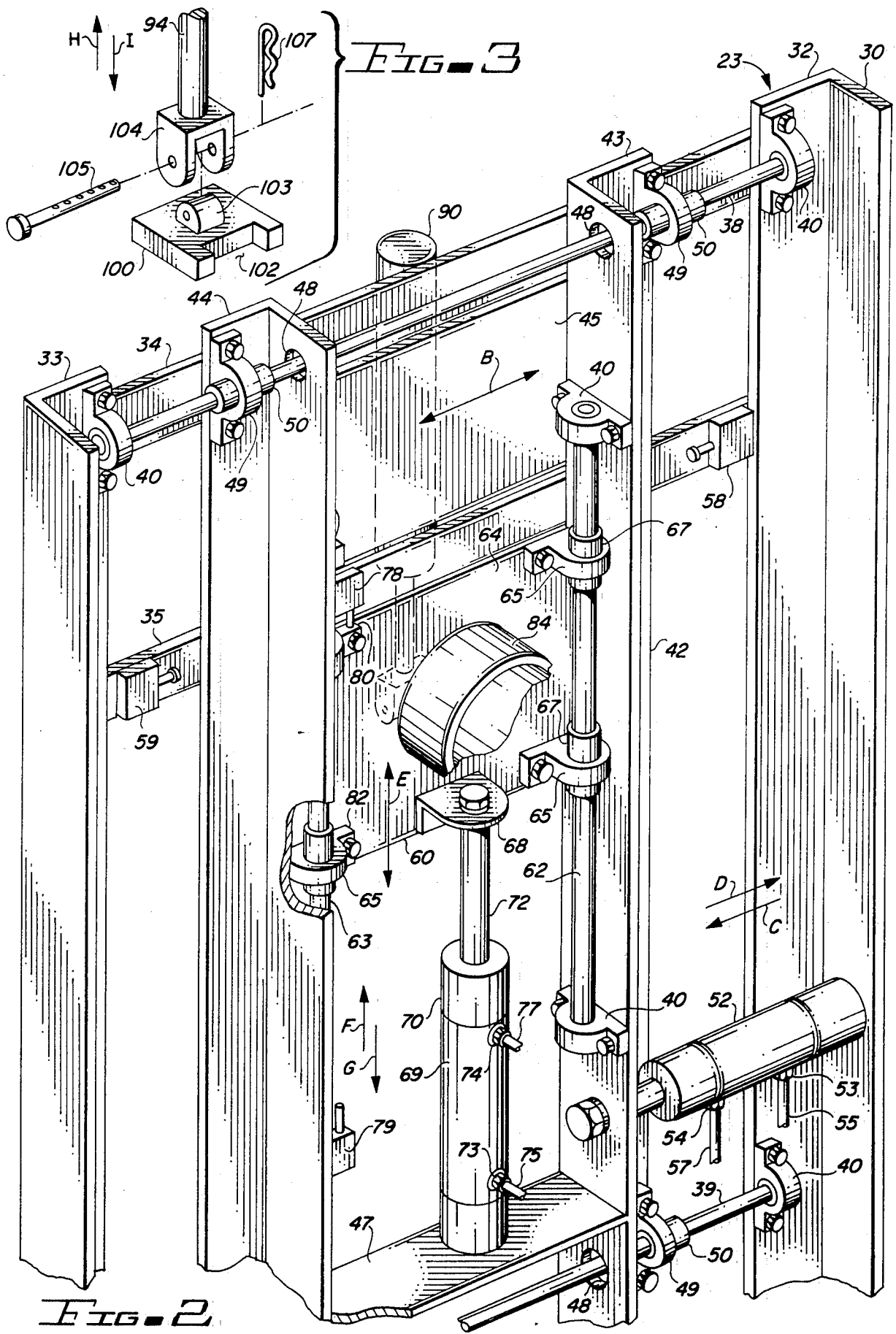

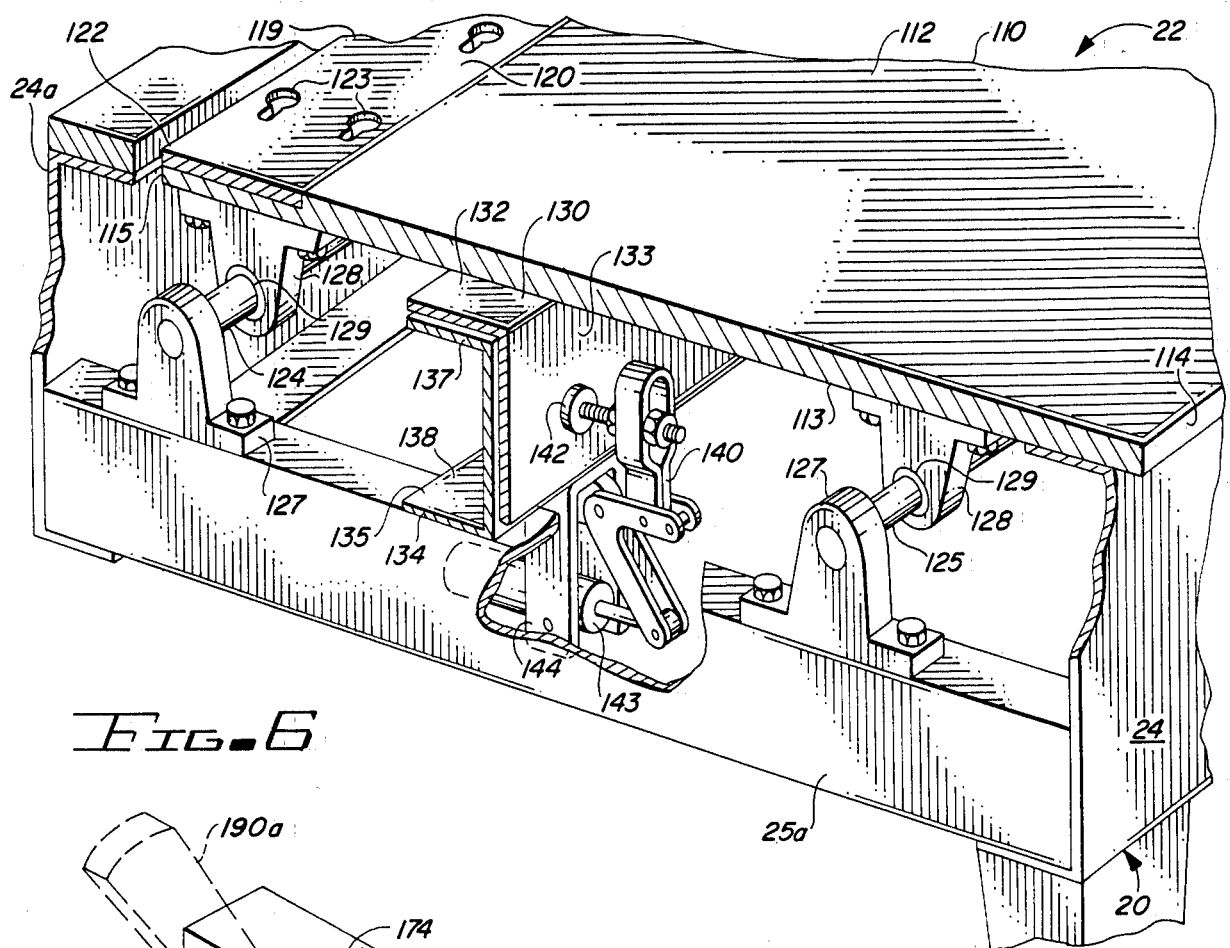
FIG-6
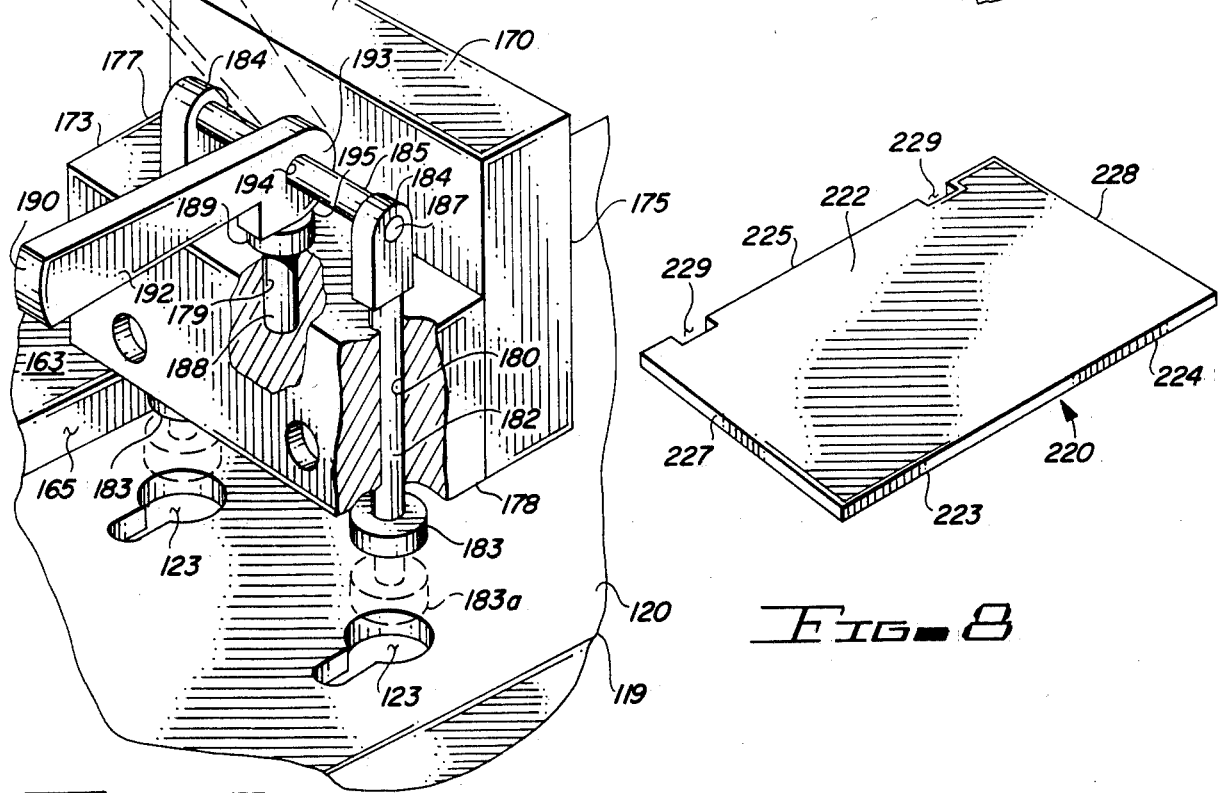
FIG-7
FIG-8

METHOD AND APPARATUS FOR MACHINING A DOOR OR THE LIKE

BACKGROUND OF THE INVENTION

1. Field of the Invention

This invention generally relates to the art of woodworking.

More particularly, the present invention relates to method and apparatus useful in the making of doors and similar articles.

In a further and more specific aspect, the instant invention concerns improved method and apparatus for forming recesses to receive hardware such as hinges.

2. Prior Art

The formation of recesses to accomodate hardware is a familiar, frequently practiced routine in the woodworking arts. Exemplary is the art of cabinetry wherein hinges are customarily secured to the edges of doors, fold-down shelves or similar structures. In order to insure a close fit between the door and the adjacent structure, for functional and asthetic reasons, it is desirable to mount the hinge in a manner such that the exposed surface of the hinge is substantially flush with the surface of the door. This requires the formation of a recess which corresponds to the dimmensions of the hinge plate.

The prior art is replete with various methods for forming a hinge plate receiving recess. For custom fitting, the woodworker may simply do individual layouts and then cut each recess with chisel and mallot. Slightly more expedient is the use of a template which is clamped to the workpiece to guide a hand held power tool, such as a router.

Hand crafted methods, being exceedingly laborious and time consuming, are generally considered suitable for custom preparation, such as in connection with maintenance procedures. The manufacture of structures, such as cabinets, furniture, and pre-hung door assemblies requiring hinges, conventionally occurs in a factory employing mass production technology. Automated equipment is mandatory to form the recesses for the two or more hinges commonly installed on each door or similar item.

To complement the automated equipment for performing other tasks, the art has proposed sundry equipment and apparatus for forming hinge recesses. In general, prior art devices include a frame which stationarily supports a single door. Aligned against a stop member, the door is urged toward the frame by various means. In one specific embodiment, a fluid operated clamp urges selected corners of the door against local support pads. In accordance with another arrangement, the door is held against a plurality of supporting rollers by a plurality of spring biased rollers.

In order to concurrently form the desired number of recesses, the prior art devices are usually provided with a plurality of cutting units which function simultaneously. The devices are, in general, especially devised for entry type doors. Accordingly, three cutting units are employed. Similarly, the devices are encumbered with additional periphernalia for installation of latch mechanisms and preparation of door jams.

The art has not, however, provided apparatus which is entirely satisfactory for forming hinge recesses in panel or cabinet type doors. Nor has the art provided means for the simultaneous handling of more than one door. Further, the prior art devices are considered unduly complex, being encumbered with extraneous components.

It would be highly advantageous, therefore, to remedy the foregoing and other deficiencies inherent in the prior art.

Accordingly, it is an object of the present invention to provide improved apparatus for machining a door or similar workpiece.

Another object of the invention is the provision of apparatus especially adapted for forming hinge receiving recesses in doors or other selected work pieces.

And still another object of this invention is to provide recess forming apparatus capable of accepting one or more doors simultaneously.

Still another object of the invention is the provision of woodworking equipment having improved means for locationally holding and supporting doors or other panel-like items.

Yet another object of the instant invention is to provide apparatus which is readily adjustable for forming recesses of a selected size.

Yet still another object of the invention is the provision of apparatus which is easily usable for forming a selected number of recesses at predetermined spacings and locations.

And a further object of the immediate invention is to provide apparatus that is conveniently usable by a single workman.

Still a further object of the invention is the provision of recess forming apparatus that is relatively unencumbered and uncomplicated to operate.

Yet a further object of the invention is to provide an improved method for machining one or more recesses into the longitudinal edge of a workpiece.

And still a further object of the invention is the provision of an apparatus, according to the above, which is relatively inexpensive to manufacture and maintain.

SUMMARY OF THE INVENTION

Briefly, to achieve the desired objects of the instant invention in accordance with a preferred embodiment thereof, there is provided support means for locationally holding and supporting a generally panel-like work piece. The support means is movably carried by a stationary base for reciprocal movement in opposite first and second directions along an axis substantially parallel to the longitudinal edge of the workpiece when held by the support means. Also carried by the base are milling means for forming a recess into the longitudinal edge of the work piece. Positioning means locate the support means at a preselected location along the axis thereof relative to the milling means.

In accordance with a more specific embodiment of the invention, the support means includes a support surface for receiving one of the sides of the workpiece thereagainst and retention means for locationally holding the workpiece at a predetermined location upon the work surface. The retention means, which is selectively variably positionable along a support surface, includes a retention element upstanding from the support surface for receiving one of the lateral edges of the work piece thereagainst and a second retention element upstanding from the support surface for abutting the other of the lateral edges of the work piece. One of the retention means includes a jaw and actuating means for reciprocally moving the jaw in selected directions toward and away from the other retention element.

The milling means, in a preferred embodiment, includes a frame carried by the base adjacent the support means and cutting means movably carried by the frame. More specifically, the cutting means includes a first carriage supported by the frame for reciprocal movement along a first path generally parallel to the longitudinal edge of the workpiece and a second carriage supported by the first carriage for reciprocal movement in direction along a path generally perpendicular to the longitudinal edge of the workpiece. Rotary cutting means for engaging and machining the workpiece are carried by the second carriage.

The positioning means includes stop means carried by the base for checking the movement of the support means in at least one of the first and second directions. In accordance with a more specific embodiment, especially devised for forming two spaced apart recesses, for example, the positioning means includes first and second stop means and anchor means for holding the sopport means at a preselected location. In a more specific embodiment, the stop means includes first and second elements, each being movable between an extended position and a retracted position. In the extended position, the selected element resides in the path of the workpiece for receiving one of the lateral edges of the workpiece thereagainst. Either element, in the extended position, projects upwardly through a slot in the support surface.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings in which:

FIG. 2 is a fragmentary rear perspective view on an enlarged scale of the central portion of the apparatus of FIG. 1;

FIG. 3 is an enlarged exploded perspective view of the lower portion of the hold down as seen in FIG. 1, the view being taken from the rear in line with the view of FIG. 2;

FIG. 6 is an enlarged fragmentary vertical sectional view taken along the line 6—6 of FIG. 1;

FIG. 7 is an enlarged fragmentary exploded perspective view of the area designated 7 in FIG. 1; and FIG. 8 is a perspective view of a door, a representative workpiece of the type to be handled by the apparatus of the instant invention.

DETAILED DESCRIPTION OF THE PREFERRED EMBODIMENT

Figure 1:
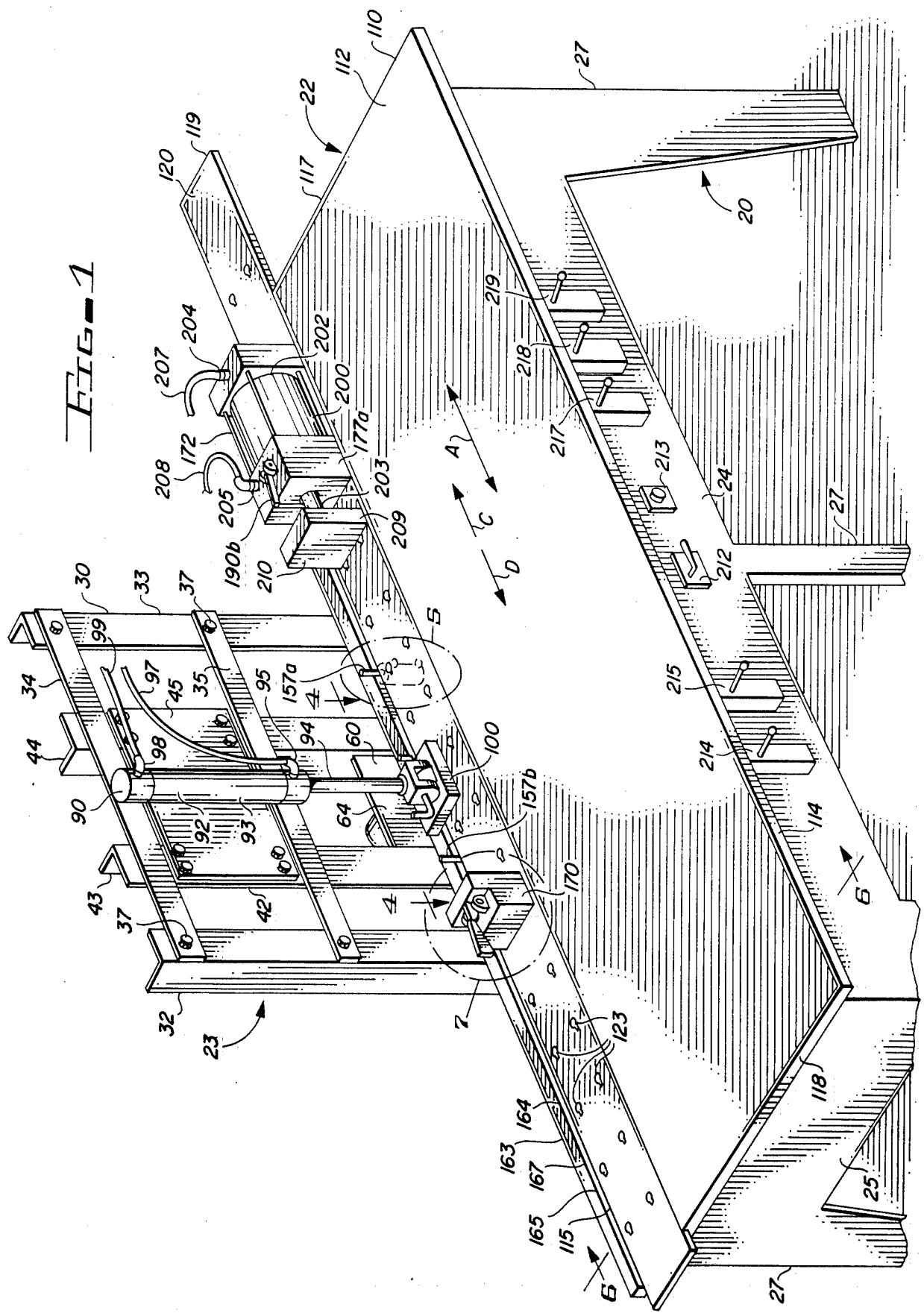
FIG. 1 is a perspective view of an apparatus constructed in accordance with the teachings of the instant invention for machining a door or the like, the illustration especially showing the top and the front and having a portion thereof broken away for purposes of illustration.

Turning now to the drawings in which like reference characters designate corresponding elements throughout the several views, attention is first directed to FIG. 1 which illustrates a representative apparatus of the instant invention including a base, a support means and a milling means, generally designated by the reference characters 20, 22, and 23, respectively. Base 20 is considered to be stationary. Support means 22, which locationally holds and supports the workpiece, is carried by the base for reciprocal movement in first and second directions as indicated by the double arrowed line A. Milling means 23 functions to form a recess into the longitudinal edge of a workpiece held by the support means. The structure and the function of the machine, which further includes positioning means for locating the support means at a preselected location relative the milling means, will become apparent to those skilled in the art as the description proceeds.

Base 20 includes horizontal longitudinal members 24, horizontal transverse members 25, and upright legs 27. Constructed in accordance with standard metal fabrication techniques, base 20 includes additional corresponding elements and applicable bracing to provide a structure suitable for the purpose as will be readily appreciated by those skilled in the art. To provide sufficient rigidity and strength it is suggested that base 20 be fabricated of metal as a weldment.

Milling means 23, as further seen in FIG. 2, includes frame 30 carried by and upstanding from base 20 at an intermediate longitudinal location. Frame 30, which in general similarity to base 20 is fabricated of metal, includes a pair of spaced apart upright members 32 and 33, preferably fabricated of angle iron to provide sufficient rigidity. Horizontal bracing members 34 and 35 are secured by any convenient expediency such as bolts 37. A pair of spaced apart guide bars, an upper guide bar 38 and a lower guide bar 39, extend between the upright members 32 and 33. The guide bars 38 and 39, which are preferably fabricated of drill rod or similar stock, have respective ends secured to the respective upright members 32 and 33 by conventional mounting brackets 40. One of the brackets 40 is not specifically illustrated, but the placement and mounting thereof will be readily understood in view of the illustrated brackets. The guide bars 38 and 39 are mutually parallel and substantially horizontal or parallel to the plane of the upper surface of support means 22.

A first carriage 42 is supported by frame 30 for reciprocal movement along a first path as represented by the double arrowed line B. The path of movement of carriage 42 is substantially parallel to the path of movement of support means 22 as will be understood in greater detail presently. First carriage 42 includes first and second upright members 43 and 44, respectively, held in spaced apart parallel relationship by upright plate 45 and lower horizontal plate 47. The elements of first carriage 42, in general similarity to the elements of frame 30, are preferably metallic and joined by welding bolts or other well known expediencies. Upright members 43 and 44 are preferably angular in cross-section. Guide bars 38 and 39 pass through suitable openings 48 in upright members 43 and 44. Four pillow blocks 49 supporting linear bearings 50 journalled upon the respective guide bars 38 and 39, are secured to the upright members 43 and 44. As a result of the fragmentary nature of FIG. 2, the pillow block 49 jornalling guide bar 39 and secured to upright 44 is not seen.

A first linear hydraulic motor, a conventional, commercially available hydraulic cylinder assembly, 52 extends between upright member 32 of frame 30 and upright member 43 of first carriage 42. Motor 52, which is of the double action type and mounted in accordance with conventional practice as will be readily understood by those skilled in the art, includes first intake port 53 and second intake port 54 which are selectively supplied with pressurized fluid through lines 55 and 57, respectively. Fluid supplied through line 55 and entering port 53 causes motor 52 to extend resulting in movement of carriage 42 in the direction of arrowed line C. Similarly, the induction of pressurized hydraulic fluid from line 57 through port 54 results in retraction of motor 52 and movement of carriage 42 in the direction of arrowed line D. It is noted that the directions indicated by the arrowed lines C and D are components of the path indicated by the double arrowed line B. A first limit switch 58 detects movement of carriage 42 to a predetermined limit in the direction of arrowed line D. A second limit switch 59 similarly detects the movement of carriage 42 in the direction of arrowed line C to a predetermined limit. The limit switches 58 and 59 which are contacted by the upright members 43 and 44, respectively, are adjustably positionable along horizontal bracing member 35.

A second carriage 60 is supported for reciprocal movement upon first carriage 42 similar to the mounting of carriage 42 upon frame 30. Second carriage 60 is moveable in reciprocal directions along a second path as indicated by the double arrowed line E. The path represented by the double arrowed line E is substantially perpendicular to the path represented by the double arrowed line B and to the upper surface of support means 22 as will be seen with greater clarity as the description evolves. Guide bars 62 and 63 are affixed to upright members 43 and 44, respectively by additional mounting brackets 40 affixed to the respective ends of the guide bars and secured to the respective upright members. Plate 64 is moveably mounted upon guide bars 62 and 63 by virtue of pillow blocks 65 which support linear barings 67.

Tab 68 extends rearwardly from plate 64 in generally parallel relationship with lower horizontal plate 47. A second linear hydraulic motor 69 having cylinder 70 and operating rod 72, extends between plate 47 and tab 68. Second hydraulic motor 69, in generally similarity to first hydraulic motor 52, is double acting having first inlet port 73 and second inlet port 74 which are supplied pressurized hydraulic fluid through lines 75 and 77, respectively. Pressurized hydraulic fluid received through first intake port 73 through line 75 cause operating rod 72 to extend resulting in movement of plate 64 in the direction of arrowed line F. Alternately, hydraulic fluid introduced into cylinder 69 through line 77 and second port 74 result in retraction of operating rod 72 and movement of plate 64 in the direction indicated by arrowed line G. The directions indicated by arrowed lines F and G are components of the path represented by the double arrowed line E. Upper and lower limit switches 78 and 79, respectively, carried by upright member 44, are adjustably positionable in directions indicated by the double arrowed line E. Upper contact element 80 and lower contact element 82 abutt limit switches 78 and 79, respectively, to signal the predetermined limits of movement of second carriage 60 in the respective directions.

Cutting means 84 are carried by second carriage 60. For purposes of illustration, as further veiwed in FIG. 4, cutting means 84 is depicted as a conventional router 85 having mounting base 87 and driving rotary cutting tool or router bit 88. As will be appreciated by those skilled in the art, conventional commercially available routers are generally provided with a flat base having threaded apertures therein for attachment of various accessories. It is also conventional practice to mount a router on the underside of a table with the router bit projecting therethrough so that the assembly may be used as a shaper. Router 85 is attached to plate 64 in accordance with such conventional practice. Router bit 88 projects through opening 89 in plate 64.

Turning again to FIGS. 1 and 2, and with further reference to FIG. 3, there is seen hold down means 90. Hold down means 90 includes linear hydraulic motor 92, which in generally similarity to linear hydraulic motors 52 and 69, includes cylinder 93 and operating rod 94. Cylinder 93, which is attached to horizontal bracing members 34 and 35 of frame 30, includes first intake port 95 which is supplied pressurized hydraulic fluid through line 97 and second intake port 98 which is supplied pressurized hydraulic fluid through line 99.

Foot 100 having cutout 102 and upstanding mounting tab 103 is removably carried at the free end of operating rod 94. To effect the removable pivotal attachment, the free end of operating rod 94 is provided with clevis 104. In accordance with conventional practice, clevis pin 105 passes through suitable apertures in mounting tab 102 and clevis 104 and is retained by clevis clip 107.

Hold down means 90 is mounted substantially upright such that operating rod 94 is substantially perpendicular to the upper surface of support means 22. Accordingly, introduction of pressurized fluid through first intake port 95 retracts operating rod 94 drawing foot 100 in an upward direction as indicated by the arrowed line H. Conversely, introduction of pressurized fluid through second intake porty 98 extends operating rod 94 urging foot 100 in the direction of arrowed line I toward support means 22. Further description of hold down means 90, especially involving function, will be described in greater detail presently.

Support means 22, as seen with specific reference to FIGS. 1 and 6, includes generally rectangular panel or table 110 having top or support surface 112, under surface 113, front longitudinal edge 114, rear longitudinal 115, and lateral edges 117 and 118. Panel 110 is readily fabricated of plywood, chipboard or other suitable material. An elongate plate 119, preferably fabricated of metal, is inset into the rear longitudinal terminal portion of panel 110 such that the upper surface 120 and the outer edge 112 are continuous with the top surface 112 and the rear longitudinal edge 115, respectively, of panel 110. A plurality of laterally spaced keyhole-shaped openings 123 extend along plate 119. Further discussion of keyhole-shaped openings 123 will be had presently.

Positioning means for locating support means 22 at a preselected location along the path represented by the double arrowed line A includes guide bars 124 and 125 which extend longitudinally of base 20 under support means 22 and substantially parallel to the path represented by the double arrowed line A. Guide bars 124 and 125 are supported by mounting brackets 127 carried by transverse frame member 25 extending between front longitudinal member 24 and rear longitudinal member 24a. Pillow blocks 128, secured to and depending from the under surface 113 of panel 110, carry linear barings 129 which are journalled on the guide rods 124 and 125. As will be appreciated by those skilled in the art, at least one additional transverse member 125a with associated mounting brackets 127 and pillow blocks 128 are incorporated into the structure to provide stable support for the support means 22.

Carried on the underside of support means 22 and extending longitudinally thereof is a clamp receiving element 130 such as may be fabricated from a structural member of angular cross-section having a generally horizontal leg 132 secured to the under urface 113 of panel 110 and an upright leg 133 depending therefrom. A stringer 134 resides immediately rearward of clamp receiving element 130. Stringer 134, herein specifically illustrated as a structural member of generally C-shaped cross-section including horizontal legs 135 and 137 and upright leg 138 and affixed to the transverse members 25, functions as an additional bracing for base 20 and as a backing element for clamp receiving element 130. It is noted that the rear surface of upright leg 133 of clamp receiving member 130 and the forward surface of upright leg 138 of stringer 134 are in sliding juxtaposition.

A conventional toggle clamp 140 having clamping foot 142 and actuated by double action linear hydraulic motor 143 is affixed to stringer 134 by bracket 144. Although not specifically herein illustrated, it is understood that hydraulic motor 143 is of the type previously described and designated by the reference characters 52 and 69 and, in general similarity thereto, includes first and second intake ports for receipt of pressurized fluid. Entrance of pressurized fluid through the first port results in an extension of the operating rod while entrance of pressurized fluid through the second intake port results in a retraction of the operating rod. In the extension mode, foot 142 is moved in a direction toward upright leg 133 of clamp receiving element 130. In the retraction mode, foot 142 is moved in a direction away from upright leg 133. Upright leg 138 of stringer 134 functions as an anvil opposing foot 142 for clamping the upright leg 133 of clamp receiving element 130 therebetween at the terminus of the extension mode. The arrangement of elements functions as anchor means for holding the support means at a preselected location along the path of travel designated by the double arrowed line A.

Figure 4:
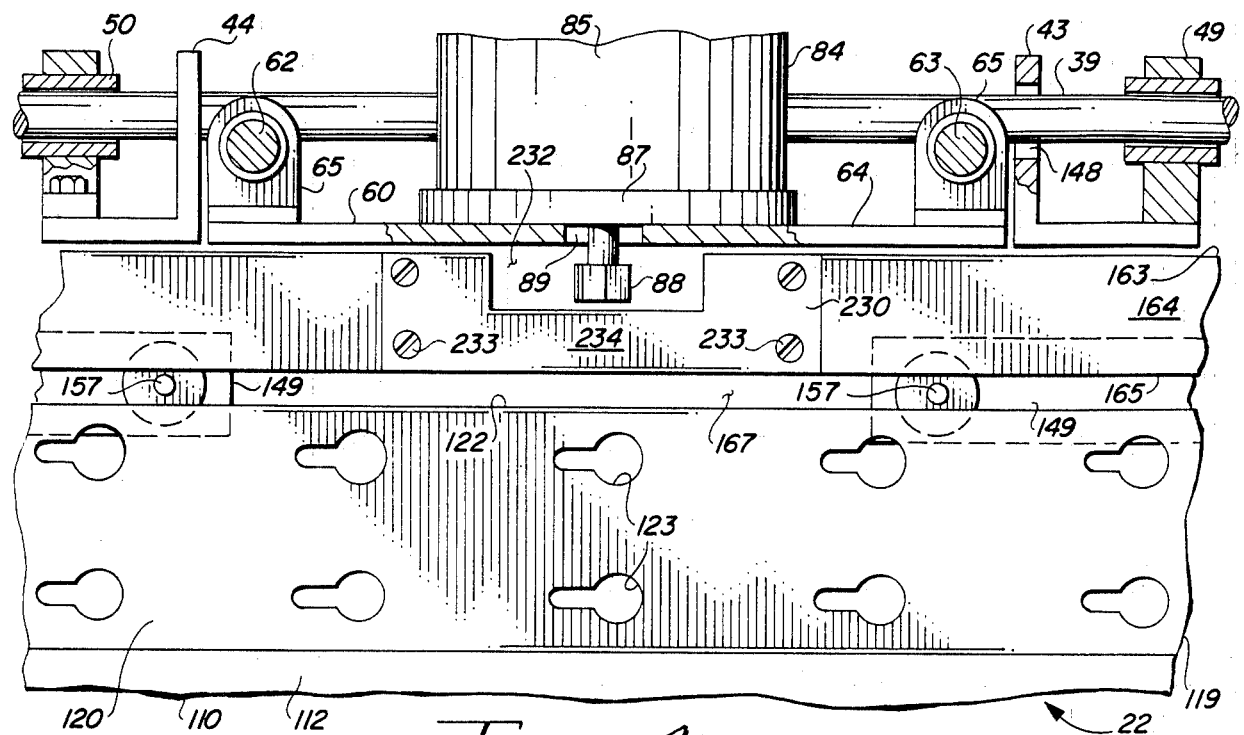
FIG. 4 is an enlarged fragmentary horizontal sectional view taken along the line 4—4 of FIG. 1.
Figure 5:
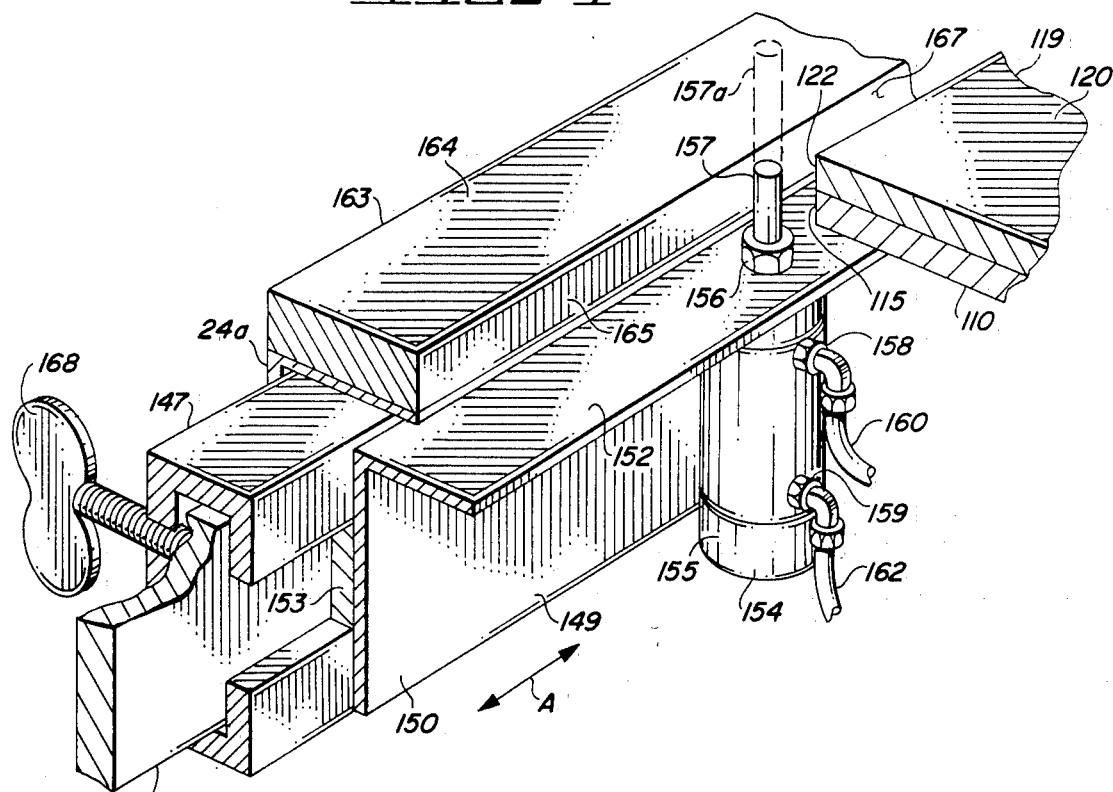
FIG. 5 is an enlarged fragmentary perspective view taken from the area designated 5 in FIG. 1.

The positioning means of the instant invention further includes stop means, a specific embodiment of which will now be described with reference to FIGS. 1, 4, and 5. Way 147, a generally C-shaped element affixed to rear longitudinal member 24 of base 20, supports slide 148 which is reciprocally movable along a path indicated by the double arrowed line A. Carrier 149, which may be readily fabricated of an L-shaped structural member having an upright component 150 and a horizontal component 152, is carried by slide 148 by means of spacer 153 which projects through the open portion of the C-shaped way 147 and is affixed to the slide 148 and the carrier 149 by any suitable working technique.

Linear hydraulic motor 154, yet another double-action hydraulic cylinder assembly including cylinder 155 and actuating rod 157, is carried by carrier 149. Cylinder 155 is affixed to carrier 159 by conventional means such as a mounting stud and nut assembly 156 which projects through an appropriately sized bore (not specifically illustrated) through horizontal component 152. Cylinder 155 includes first intake port 158 and second intake port 159 which alternately and selectively receive pressurized hydraulic fluid through lines 160 and 162, respectively. As a result of fluid entering into second intake port 159, actuating rod 157 is extended to the broken outline position 157a. Alternate introduction of pressurized fluid through first port 158 results in retraction of actuating rod 157 to the solid outline position illustrated.

Cap 163, essentially an elongate strip fabricated from the material of construction of panel 110 and having top surface 164 and inner edge 165, is carried upon rear longitudinal member 24a. Top surface 164 lies in the plane of and provides a continuation of the previously described surfaces 112 and 120. Accordingly, the surface defined by the combination of subsurfaces 112, 120, and 164 function, in combination, as the workpiece supporting surface of the instant invention. Surfaces 112 and 120 are movable in directions indicated by the double arrowed line A, however, while surface 164 is stationary.

Edge 165 of cap 163 is spaced from edge 115 of table 110, defining slot 167 therebetween. Slot 167 is of sufficient width to receive actuating rod 157 of linear hydraulic motor 154 therethrough. In the retracted position, the tip of actuating rod 157 resides below the work support surface, while projecting above in the extended position. As a result of the cooperation between slide 148 and slot 167, hydraulic motor 154 is selectively positionable along the work support surface in directions indicated by the double arrowed line A. Thumb screw 168, threadedly engaged within an aperture extending through way 147 and functioning as a set screw, retains motor 154 at selected positions.

The support means, generally designated by reference character 22, further includes retention means for locationally holding the workpiece at a predetermined location upon the support surface. With reference again being had to FIG. 1, it is seen that the retention means includes a first retention element 170 and a second retention element 172. First retention element 170, viewed in greater detail in FIG. 7, includes hold down mechanism 173 carrying jaw 174 having workpiece abutting surface 175. Surface 175 is generally planar being perpendicular in one direction to support surface 112 and being perpendicular in another direction to the path represented by the double arrowed line A. Hold down mechanism 173 includes support block 177 having an undersurface 178 which is continuous with the undersurface of jaw 170 and three bores extending therethrough substantially perpendicular to surface 178. Bore 179 is located at an intermediated lateral position. A pair of bores 180, only one of which is illustrated, reside outboard of bore 179. A shaft 182, having foot 183 at the lower end and head 184 at the upper end, is slidably disposed within each bore 180. A connecting rod 185 extends between shafts 182, having respective ends received within bores 187 in heads 184. Foot 183 is sized to be received through the larger portion of keyhole-shaped opening 123 while shaft 182 is sized to be received within the smaller portion thereof.

Plunger 188 having head 189 is slidably disposed within bore 179. Actuating lever 190, having handle portion 192 and cam portion 193, is carried upon connecting rod 185. More specifically, connecting rod 185 passes through bore 194 in cam portion 193. Head 189 of plunger 188 functions as a follower to camming surface 195 of cam portion 193 of actuating lever 190.

Actuating lever 190 is rotatably movable about the axis of connecting rod 185 between a lowered position shown in solid outline and a raised position shown in broken outline and designated by the reference character 190a. As will be appreciated by those skilled in the art, feet 183 correspondingly move in an opposite direction between a raised position shown in solid outline and a lowered position shown in broken outline and designated 183a. Cam surface 195 is contoured such that when actuating lever 190 is in the raised position, the pair of feet 183 may be entered through any selected pair of openings 123. Subsequently, first retention element 170 is shifted bringing the shafts 182 into the smaller portions of the corresponding keyhole-shaped openings and actuating lever 190 lowered, drawing feet 183 upwardly against the undersurface of plate 119 and surface 178 downwardly against surface 120 of plate 119. Accordingly, first retention element 170 is clampingly locked at the selected location.

Second retention element 172, as best viewed in FIG. 1, includes yet another linear motor 200, a conventional commercially available hydraulic cylinder assembly including cylinder 202 and actuating rod 203. Being of the double-acting type previously described, cylinder 202 includes first and second intake ports 204 and 205 which alternately and selectively receive pressurized hydraulic fluid through lines 207 and 208, respectively. Jaw 209 having workpiece abutting surface 210 is carried by actuating rod 203.

A hold down mechanism, such as previously described hold down mechanism 173 including support block 177a and actuating lever 190b is affixed to the forward end of linear hydraulic motor 200. Accordingly, the second retention element 172 is selectively positionable along plate 119 in the manner of first retention element 170. Once secured to plate 119, jaw 174 is considered stationary. Jaw 209 is reciprocally movable in opposition to jaw 174. In response to selective alternate introduction of pressurized hydraulic fluid through first intake port 204 and second intake port 205, jaw 209 moves in the direction indicated by the arrowed lines D and C. respectively. Such directions have been previously described.

Front longitudinal member 24 functions as a control panel carrying an arrangement of electric and hydraulic switches and controls. First switch 212, preferably a pull type switch for safety purposes, energizes router 85. Second switch 213 is responsible for flow of pressurized hydraulic fluid to motors 52 and 69 and energizes the associated limit switches whereby first carriage 42 and second carriage 60 are set into motion to move along the prescribed paths within the defined limits.

In accordance with the immediately preferred embodiment of the invention, the other controls are preferably in the form of two-way valves. First valve 214 controls one of the linear motors 154, which for purposes of distinction is designated 154a in FIG. 1. When the control lever is lifted, the associated actuating rod 157 projects upwardly to the extended position. Conversely, when the control lever is lowered, actuating rod 157 retracts. For purposes of orientation, the linear motor designated 154a is considered the first stop means while the second hydraulic motor designated 154b is considered the second stop means. Second valve 215 controls the second stop means 154b.

Third valve 217 controls the flow of pressurized hydraulic fluid to double-action linear hydraulic motor 143. Fourth valve 218 selectively directs pressurized hydraulic fluid to first or second intake port 204 and 205, respectively, of second retention element 172. Fifth valve 219 selectively controls the up or down movement of foot 100 associated with hold down means 90.

The means of specifically interconnecting the several switches and controls with the various electrical and hydraulic components is not illustrated as such will be readily apparent to those skilled in the art. It is also appreciated that such may be accomplished in accordance with various schemes utilizing knowledge and components considered to be standard technique. Further, the immediate system may be hydraulic, pneumatic, or electrical. For example, electric solenoids may be substituted as an actuating means in lieu of the described linear hydraulic motors. Exemplary is the actuating rod 157 associated with the stop means which can be caused to extend or retract in response to an electromagnetic device of known commercially available type.

A door, generally designated by the reference character 220 and illustrated in FIG. 8, is representative of a typical workpiece of the type intended to be handled by the apparatus of the instant invention. The workpiece includes first side 222, second side 223, first longitudinal edge 224, second longitudinal edge 225, first lateral edge 227, and second lateral edge 228. Also shown, for purposes of visualization, are recesses 229 of the type formed by the instant invention. It is noted that the recesses 229, which are intended to be typically representative and formed along first longitudinal edge 225, have a finite preselected length and depth and extend through the workpiece between the first and second sides. Further, the recesses 229, of which two have been selected for purposes of illustration, are located at selected distances from the respective first and second lateral edges with a preselected distance therebetween.

Again referring to FIG. 4, it is noted that a reinforcement plate 203 having generally rectangular cut-out 232 is affixed to cap 163 as by flathead screws 233. Reinforcement plate 230 is recessed into cap 163 such that the exposed or upper surface 234 is substantially flush with the surface 164. Rectangular cut-out 232 may be selected to be of a size generally corresponding to the maximum allowable limits of movement of router bit 88 or, alternately, may be selected of a size to closely approximate the size of recess 229. For reasons which will become apparent presently, cut-out 102 in foot 100 closely corresponds to the finished size of the recess 229.

The apparatus of the instant invention may be employed to form a single recess in a single workpiece. However, the apparatus is best suited for a production run wherein multiple recesses are concurrently formed in more than a single workpiece. The method of forming a recess in a workpiece utilizing the apparatus of the instant invention, will now be described.

After the desired number of similar workpieces have been cut to size, the apparatus of the instant invention is first prepared for use by observing that the milling means, router 85 and router bit 88, is de-energized and resides in the rest position. The rest position is defined as first carriage 42 being at the limit of travel in the direction of arrowed line D and second carriage 60 being at the limit of travel in the direction of arrowed line G. The milling means automatically assumes the rest position at the termination of operation as will be seen presently.

Next, the appropriate controls are manipulated such that foot 100 associated with hold down means 90, movable jaw 209 associated with second retention element 172 and actuating rods 157 associated with first and second stop elements 154a and 154b, respectively, are in the retracted potition. Further, first retention element 170 and second retention element 172 are disengaged from plate 119. Table 110 is placed in an intermediate location relative base 20 and the anchor means, toggle clamp 140 and the associated mechanism, in either optional position.

A selected foot 100, having an opening 102 corresponding to the size of the recess to be formed, is connected to clevis 104. Limit switch 59 is adjusted along horizontal bracing member 35 to limit the travel of first carriage 42 along the path designated by double arrowed line B to a distance corresponding to the desired length of the recess. Limit switch 78 is similarly adjusted such that second carriage 60 will carry the router bit 88 from a position below to a position above the combined height of the number of workpieces to be concurrently machined. In defining the limits of travel of the carriages, as will be appreciated by those skilled in the art, allowance must be made for the diameter of router bit 88.

It is considered prudent practice in the art to have provided at least one additional workpiece 220 which is designated as the setup piece and which may be scrapped as a result of trial cuts made during machine setup. Also, in accordance with conventional practice, the exact placement and size of the proposed recesses 229 may be marked upon the designated setup piece. The selected workpiece 220 is now placed upon the support means 22, preferably at an intermediate longitudinal location. During placement, a selected one of the sides, 222, 223, is placed upon the support surface 112. The selected longitudinal edge, herein illustrated as edge 225, is placed against upright members 32 and 33 of frame 30 which functions as a guide for aligning the selected longitudinal edge with the path of movement represented by the double arrowed line A. The first retention element 170 is now moved along plate 119 and locked in place utilizing the pair of key-hole shaped opeining 123 which will place jaw 174, specifically surface 175, in the closest proximity to the corresponding lateral edge specifically illustrated as edge 227, of workpiece 220. The workpiece is then moved in a direction of arrowed line D until edge 227 abuts surface 175. Second retention element 172 is similarly adjusted. Thereafter, control 218 is manipulated resulting in movable jaw 209 moving in the direction of arrowed line D until surface 210 abuts the other lateral edge 228.

Table 110 is now moved, in a selected one of the reciprocal directions as appropriate, until the intended location of the recess 229, as marked upon the setup piece, aligns with the cut-out 102 in foot 100. Controls 217 and 219 are now manipulated actuating, respectively, the anchor means for locking table 110 at the desired location and lowering foot 100 to bear upon the other side of workpiece 220, firmly urging the first side 223 against the supporting surface. If not already being so, set screw 168 is loosen and the selected stop element, for example 154a, is moved to reside at a location not under workpiece 220. The respective actuating rod 157 is extended by manipulation of control 214. Subsequently, the selected stop element is moved along way 147 until the actuating rod 157 abuts the respective lateral edge of the workpiece. In the immediately foregoing description, it would be appropriate to move stop element 154a in the direction of arrowed line C until actuating rod 157 abuts lateral edge 227 of workpiece 220.

If a second recess is to be formed, certain of the foregoing operations are repeated. Specifically, the actuating rod of stop element 154a is lowered, foot 100 is raised and the table 110 is repositioned to the second selected location. It is noted that the table 110 is moved in response to manual pressure. After again lowering foot 100 which functions as an alignment element, the second stop member 154b is adjusted in a manner similar to adjustment of first stop element 154a. It is further noted that second stop member 154b may be adjusted against either lateral edge of the workpiece. The workpiece is finally removed after foot 100 and jaw 209 are retracted.

After setup and adjustment, as described above, the apparatus of the instant invention may be utilized for forming recesses in a selected numer of workpieces without further adjustment. The initial production step is the placing of the desired number of stacked workpieces upon surface 112 and locationally holding the lateral edges with retention elements 170 and 172. Secondly, the support means 22 is moved in the appropriate direction until the selected lateral edge of at least the lower workpiece abuts the selected stop member 154 and foot 100 is lowered. Switches 212 and 213 are now energized, in sequence, to energize milling means 23.

At the initiation of activation of the milling means, second carriage 60 powered by linear hydraulic motor 69, moves in the direction of arrowed line F until contact element 80 trips upper limit switch 78. Resultingly, the direction of linear hydraulic motor 69 and second carriage 60 is reversed, moving in the direction of arrowed line G. Movement in the direction of arrowed line G continues until lower contact element 82 comes into contact with lower limit switch 79. At this point, linear hydraulic motor 52 is steppingly activated to advance first carriage 42 in the direction indicated by the arrowed line C a distance not greater than the diameter of router bit 88. Concurrently, second carriage 60 is passed through a second cycle of movement along the path represented by the double arrowed line E. It is suggested that the lower limit of travel of carriage 60, as determined by lower limit switch 79, is sufficiently below the workpiece to allow for the stepping action of first carriage 42 prior to router bit 88 again contacting the workpiece.

The foregoing cyclic action of carriage 60 and the stepping action of hydraulic motor 52 continues until upright member 44 abuts limit switch 59. Accordingly, limit switch 59 is held in a closed condition as carriage 60 moves the direction of arrowed line F during the final cycle of movement. At the terminus of the final cycle of movement, switch 78 is also closed. With switches 59 and 78 closed, hydraulic motors 52 and 69 are concurrently energized to return router 84, the cutting means of the instant invention, to the rest position. At the rest position, switches 79 and 58 are closed, thereby disabling the milling means until switch 213 is again activated.

If a second recess is to be formed along the longitudinal edge of workpiece 220, first stop means 154a is lowered, the second stop means 154b is raised and the support means is repositioned bring the workpiece against the second stop means 154b as previously described.

It is apparent from the foregoing description that router bit 88 always cuts in an upward direction toward foot 100. No cutting takes place during downward movement of second carriage 60. Foot 100, by virtue of cut-out 102, applies downward pressure on the upper surface of workpiece 220 in the immediate area of the cut to prevent chipping or splintering of the workpiece.

Various changes and modifications to the embodiment herein chosen for purposes of illustration will readily occur to those skilled in the art. As previously noted, the apparatus may be actuated by hydraulic, pneumatic, or electric means. It is also apparent that the device may be utilized to cut mortises or blind recesses. This would involve adjustment of the limit switch to control the upper movement of the second carriage and movement along the direction indicated by the arrowed line D by the first carriage after the second carriage has reached the upper terminous of the final cycle of movement. It is also apparent that the linear moving components, such as the table and the carriages, may be supported by various guide or way systems. To the extent that such modifications do not depart from the spirit of the invention, they are intended to be included within the scope thereof which assessed only by a fair interpretation of the folowing claims.

Having fully described and disclosed the present invention and alternate embodiments thereof, in such clear and concise terms as to enable those skilled in the art to understand and practice the same, the invention claimed is:

1. An apparatus for receiving a workpiece, which workpiece includes:
   first and second sides,
   first and second lateral edges, and
   a longitudinal edge,
and for forming a recess into said longitudinal edge at a predetermined location, said apparatus comprising:
   a. a stationary base;
   b. a support means carried by said base for locationally holding and supporting said workpiece, said support means being reciprocally movable in opposite first and second directions along an axis substantially parallel to the longitudinal edge of said workpiece when locationally held;
   c. milling means carried by said base for forming a recess into the longitudinal edge of said workpiece; and
   d. positioning means for locating said support means at a preselected location along said axis relative to said said milling means.

2. The apparatus of claim 1, wherein said support means includes:
   a. a support surface for receiving a selected one of the sides of said workpiece thereagainst; and
   b. retention means for locationally holding said workpiece at a predetermined location upon said support surface.

3. The apparatus of claim 2, wherein said predetermined location of said workpiece upon said support surface is selectively variable along a path substantially parallel to the axis along which said support means is movable.

4. The apparatus of claim 3, wherein said retention means is selectively variably positionable along a path substantially parallel to the axis along which said support means is movable.

5. The apparatus of claim 2, wherein said retention means includes:
   a. a first retention element upstanding from said support surface for receiving one of the lateral edges of said workpiece thereagainst; and
   b. a second retention element upstanding from said support surface for receiving the other of the lateral edges of said workpiece thereagainst.

6. The apparatus of claim 5, wherein said first and said second retention elements are variably positionable along a path sustantially parallel to the axis along which said support means is movable at independently selectable locations.

7. The apparatus of claim 5, wherein said second retention means includes:
   a. a movable jaw spaced from and opposing said first retention element; and
   b. actuating means for reciprocally moving said jaw in selected directions toward and away from first retention element.

8. The apparatus of claim 1, wherein said milling means includes:
   a. a frame adjacent said support means; and
   b. cutting means movably carried by said frame for forming said recess into the longitudinal edge of said workpiece
   said cutting means having a rest position remote from said workpiece when held by said support means,
   said cutting means being movable from said rest position along a working path for intercepting and forming a recess into the longitudinal edge of said workpiece.

9. The apparatus of claim 8, further including actuating means for moving said cutting means along said working path.

10. The apparatus of claim 9, wherein said working path includes:
    a. a first component of movement in reciprocal directions along a first path generally parallel to the longitudinal edge of said workpiece; and
    b. a second component of movement in reciprocal directions along a second path generally perpendicular to the longitudinal edge of said workpiece.

11. The apparatus of claim 10, wherein said actuating means includes limit means for defining limits of movement of said first component in said reciprocal directions.

12. The apparatus of claim 11, wherein said limit means are adjustably positionally carried by said frame whereby the length of said recess along the longitudinal edge of said workpiece is selectively variable.

13. The apparatus of claim 8, wherein said cutting means includes:
    a. a first carriage supported by said frame for movement in reciprocal directions along a first path generally parallel to the longitudinal edge of said workpiece;
    b. a second carriage supported by said first carriage for movement in reciprocal directions along a second path generally perpendicular to the longitudinal edge of said workpiece;
    c. rotary cutting means carried by said second carriage for engaging and machining said workpiece.

14. The apparatus of claim 13, further including:
    a. second actuating means including,
       i. power means for moving said first carriage in said reciprocal direction along said first path, and
       ii. limit means for defining the limits of movement of said first carriage in said reciprocal directions; and
    b. third actuating means including
       i. power means for moving said second carriage in said reciprocal direction along said second path, and
       ii. limit means for defining the limits of movement of said second carriage in said reciprocal directions.

15. The apparatus of claim 14, wherein:
    a. said cutting means includes a cutting tool having a defined width of cut; and b. said power means of said second actuating means moves said first carriage in increments not greater than said width of cut in at least one of said reciprocal directions along said first path.

16. The apparatus of claim 2, wherein said positioning means includes stop means carried by said base for checking the movement of said support means in at least one of said first and second directions.

17. The apparatus of claim 16, wherein said positioning means further includes anchor means for holding said support means at said preselected location.

18. The apparatus of claim 17, wherein said anchor means includes:
   a. a clamp receiving element carried by said support means; and
   b. a clamp carried by said base for selectively engaging said clamp receiving element.

19. The apparatus of claim 16, wherein said stop means receives at least one of said first or second lateral edges of said workpiece thereagainst.

20. The apparatus of claim 19, wherein said stop means includes:
   a. an elongate slot formed into said support means and extending substantially parallel to the axis of movement of said support means; and
   b. a stop member including,
      i. a first element carried to said base, and
      ii. a second element carried by said first element and reciprocally movable between an extended position in which said second element projects through said slot and beyond said support surface for receiving said at least one of said first or second lateral edges of said workpiece thereagainst, and
   a retracted position remote from receiving said at least one of said first or second lateral edges of said workpiece thereagainst.

21. The apparatus of claim 20, wherein said stop member further includes actuating means for moving said second element between said extended position and said retracted position.

22. The apparatus of claim 20, wherein said first element is movably carried by said base for selective adjustable positioning along a path substantially parallel to the axis of movement of said support means.

23. The apparatus of claim 20, wherein said stop means includes a second said stop member carried by said base.

24. The apparatus of claim 22, wherein said stop means includes a second said stop member having a said first element movably carried by said base for selective adjustable positioning along said path.

25. The apparatus of claim 2, further including hold down means carried by said base for urging said workpiece against said support surface subsequent to said support means being located at said preselected location.

26. The apparatus of claim 25, wherein said hold down means includes:
   a. a first element affixed to said base; and
   b. a second element carried by said first element and movable between
      an extended position for abutting said workpiece, and
      a retracted position remote from said workpiece.

27. The apparatus of claim 26, further including a foot carried by said second element for bearing against the other one of the sides of said workpiece.

28. The apparatus of claim 27, further including a cut-out formed in said foot
   said cut-out being sized and shaped to correspond with the recess to be formed into said workpiece and being positioned against said workpiece of said predetermined location.

29. The appratus of claim 27, wherein said foot is removably carried by said second element.

30. The method of forming a recess of selected length into a longitudinal edge of a workpiece, which workpiece further includes
   first and second sides, and first and second lateral edges,
said method comprising the steps of:
   a. securing said workpiece to a support means;
   b. positioning said support means at a preselected location relative a milling means having a cutting tool;
   c. moving said milling means in a direction whereby said cutting tool intercepts said workpiece and cuts said recess into said longitudinal edge.

31. The method of claim 30, wherein the step of securing includes the sub-step of placing one of said sides of said workpiece against a support surface of said support means.

32. The method of claim 31, including the additional step of exerting pressure on the other of said sides of said workpiece in a direction toward said support surface before moving said milling means.

33. The method of claim 31, wherein the step of securing includes the further sub-step of gripping said workpiece by the lateral edges thereof.

34. The method of claim 30, wherein the step of positioning includes the sub-step of traversing said support means along an axis of movement substantially parallel to the longitudinal edge of said workpiece.

35. The method of claim 33, wherein the step of positioning includes the further sub-step of placing a stop member in the path of movement of said workpiece as said workpiece is carried along by said support means.

36. The method of claim 34, wherein the sub-step of traversing is continued until one of the lateral edges of said workpiece abutts said stop member.

37. The method of claim 30, further including the additional step of indexing said milling means in a direction substantially parallel to the longitudinal edge of said workpiece and repeating said step of moving said milling means.

38. The method of claim 37, wherein the steps of indexing and moving said milling means are repeated until said recess is of said selected length.

39. The method of claim 30, further including the additional step of repositioning said support means at a second preselected location,
   said moving step being repeated to form a second said recess into the longitudinal edge of said workpiece.

40. The method of claim 39, wherein:
   a. said positioning step includes the sub-steps of
      i. placing a first stop member in the path of movement of said workpiece as said workpiece is carried along by said support means, and
      ii. traversing said support means along an axis of movement substantially parallel to the longitudinal edge of said workpiece until one of the lateral edges of said workpiece abutts said first stop member; and
   b. repositioning step includes the sub-step of i. withdrawing said first stop member from said path of movement,
ii. placing a second stop member in said path of movement, and
iii. repeating said traversing sub-step.

41. The method of claim 40, wherein the step of moving said milling means is repeated subsequent to the step of positioning said support means and to the step of repositioning said support means.

* * * * *